United States Patent

Sorteberg

[15] 3,672,629
[45] June 27, 1972

[54] NON-BLEED PILOT VALVE

[72] Inventor: Johannes Sorteberg, c/o Sorteberg Controls Corp. 540 Connecticut, Norwalk, Conn. 06854

[22] Filed: May 18, 1970

[21] Appl. No.: 38,115

[52] U.S. Cl............................251/61.2, 251/61.4, 137/627.5
[51] Int. Cl.........................................................F16k 31/165
[58] Field of Search..............251/61, 61.4, 354, 61.2, 61.5, 251/61.3; 137/627.5

[56] References Cited

UNITED STATES PATENTS

| | | | |
|---|---|---|---|
| 1,008,120 | 11/1911 | Davidson et al. | 251/61.2 X |
| 2,564,569 | 8/1951 | Goehring | 251/61.4 |
| 3,240,223 | 3/1966 | Vanderhorst | 137/627.5 X |
| 2,482,291 | 9/1949 | Rush et al. | 251/61 X |
| 2,171,613 | 9/1939 | Vance | 137/627.5 X |

FOREIGN PATENTS OR APPLICATIONS

| | | | |
|---|---|---|---|
| 557,707 | 5/1923 | France | 251/61.3 |
| 958,435 | 9/1949 | France | 251/354 |

*Primary Examiner*—Arnold Rosenthal
*Attorney*—Mattern, Ware and Davis

[57] ABSTRACT

A swivel joint between two interconnected members in a pilot valve which are responsive to force differentials and capable of being extremely sensitive to these force differentials so as to initiate the proper motion to equalize the forces throughout. In the preferred embodiment, the swivel joint comprises a firmly seated ball bearing in the plunger of the pilot valve and an exhaust tube which incorporates a contact post and a biasing spring to urge and maintain the exhaust tube assembly in continual contact with the ball bearing. This arrangement allows the plunger to pivot freely while the exhaust tube can move laterally with a minimization of frictional contact. The result is a pilot valve which is extremely sensitive and responsive to pressure variations. Pilot valve sensitivity is additionally increased by axially incorporating a pinion with the exhaust tube, while establishing a gap therebetween. This construction provides an unobstructed, controllable path for exhausting gaseous fluids.

4 Claims, 4 Drawing Figures

PATENTED JUN 27 1972  3,672,629

INVENTOR
JOHANNES SORTEBERG

BY
Mattern Ware and Davis
ATTORNEYS

NON-BLEED PILOT VALVE

SUMMARY OF THE INVENTION

This invention relates to a pilot valve, and more particularly to a non-bleed pilot valve for improving the stability measurement of an automatically balanced control system.

In my prior U.S. Pat. No. 3,289,933, issued Dec. 6, 1966, entitled Weighbeam Control System, I disclosed the use of a pilot valve to increase the output of my weighbeam system in solving the equation $A \times C = B \times D$, where $A$, $B$, $C$, and $D$ represent forces acting upon the weighbeam system. I have discovered, however, that the pilot valve is subject to internal friction which reduces its sensitivity and accuracy.

OBJECTS OF THE INVENTION

Therefore, it is a principal object of this invention to provide an improved non-bleed pilot valve with increased sensitivity and accuracy.

Another object of the invention is to provide a non-bleed pilot valve of the above character which minimizes frictional contact between moving members.

A further object of this invention is to provide a non-bleed pilot valve of the above character which is fast acting in its response to balancing pressure changes.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

THE DRAWINGS

For a fuller understanding of the nature and objects of the invention, reference should be had to the following detailed description taken in connection with the accompanying drawings, in which.

The same reference characters refer to the same elements throughout the several views of the drawings.

DETAILED DESCRIPTION

Figure 1:
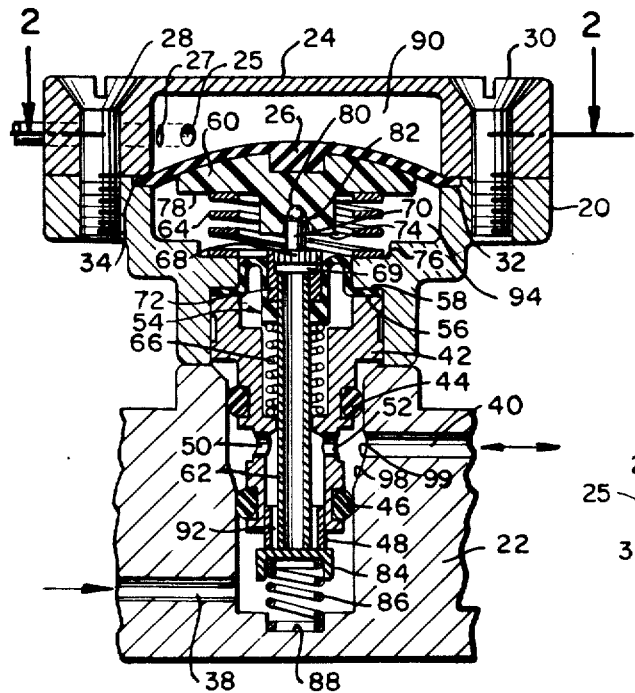
FIG. 1 is a cross sectional side view of the non-bleed pilot valve of this invention, taken along line 1—1 of FIG. 3, with the non-bleed pilot valve shown in the balanced position.

The pilot valve comprises main portion 20 and second portion 22. Cap 24, which holds diaphragm 26 in place, is attached to main portion 20 by screws 28 and 30. Cap 24 also incorporates a restricted port 25 and a port 27. Main portion 20 is provided with an annular recess 32 in which the outer portion of diaphragm 26 is placed and sealed by cap 24 between lower edge 34 of cap 24 and recess 32 of main portion 20. Main portion 20 also comprises exhaust port 36, while second portion 22 comprises ports 38 and 40.

Figure 3:
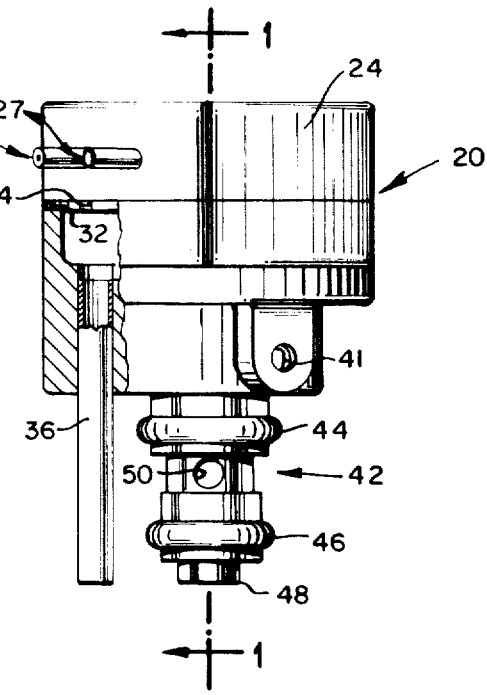
FIG. 3 is a side view of a portion of the apparatus of FIG. 1 partially broken away.
Figure 2:
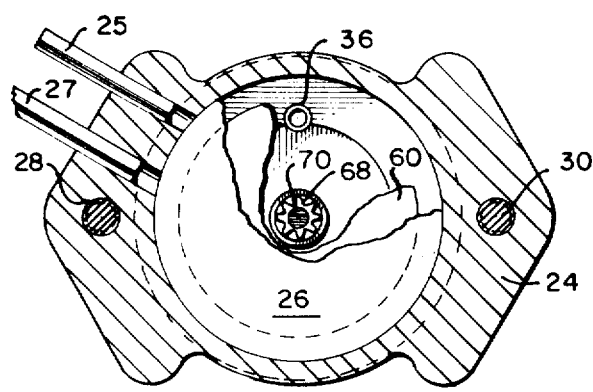
FIG. 2 is a top plan view partially broken away, taken along line 2—2 of FIG. 1.

Inner portion 42 is firmly pressed in main portion 20 and maintained in that position by set screw 41, shown in FIG. 3. Inner portion 42 comprises O-rings 44 and 46, valve seat 48, ports 50 and 52 and guide hole 53. Also, inner portion 42 sandwiches sealing diaphragm 54 between the upper surface 56 of inner portion 42 and land 58 of main portion 20.

Main portion 20 also comprises a plunger 60, exhaust tube 62, return spring 64 and biasing spring 66. Pinion 68 incorporating a post 70 is press-fit in a collar 72, while exhaust tube 62 is similarly press-fit in collar 72, establishing gap 69 therebetween. Biasing spring 66, which coaxially surrounds exhaust tube 62, urges exhaust tube 62 vertically upward against plunger 60.

Return spring 64 is coaxially positioned about boss 74 of plunger 60 and is compressed between the underside 78 of plunger 60 and land 76 of main portion 20. Ball bearing 80 is pressed into tapered hole 82 of boss 74 of plunger 60. Post 70 of pinion 68 is in contact with bearing 80 of plunger 60. Biasing spring 66 assures that post 70 will continually be in contact with bearing 80. Completing the assembly is valve disc 84 and spring 86. Spring 86 is positioned within recess 88 of second portion 22 and biases valve disc 84 toward valve seat 48 and exhaust tube 62. In operation, air pressure, generally about 20 psi, is supplied to ports 25 and 38. Port 25 is restricted and most of the pressure is bled off through restricted port 27. When the weighbeam system is balanced, the pilot valve is in the position shown in FIG. 1.

While the pilot valve may be operated in various systems at various pressures and for various purposes, for illustration the pilot valve operation will be described in association with my above-identified patent. Port 27 communicates with a nozzle, deflector position sensor. When the pressure in chamber 90 increases, due to a change in nozzle to deflector distance, diaphragm 26 and plunger 60 move downward, compressing return spring 64. The downward motion of plunger 60 causes exhaust tube 62 to similarly move against valve disc 84, compressing spring 86. The movement of exhaust tube 62 then terminates the seal between the valve seat 48 and valve disc 84, and the air supplied to port 38 is now able to enter through valve seat 48, travel up passage 92, between valve seat 48 and exhaust tube 62, and exit through outlets 50 and 52, being delivered finally through port 40. The air pressure now available at port 40 is delivered to one or more of the load cells of my weighbeam system. The air pressure supplied at port 40 causes the system to readjust, resulting in feedback to the nozzle, communicating with port 27, and produces a decrease in the pressure in chamber 90. As the pressure in chamber 90 is returned to its original supply level, exhaust tube 62, plunger 60, and diaphragm 26 return to the position shown in FIG. 1. This causes the resealing of valve seat 48 with valve disc 86. Biasing spring 66 maintains post 70 of pinion 68 in supporting contact with bearing 80 of plunger 60, thereby assuring the simultaneous movement of draft tube 62 and plunger 60.

When the nozzle and deflector in my weighbeam control system produce a decrease in pressure, in chamber 90, return spring 64 expands, pushing plunger 60 and diaphragm 26 further into chamber 90. Biasing spring 66 similarly pushes draft tube 62 in the same direction while maintaining post 70 in supporting contact with bearing 80. This causes the seal between draft tube 62 and valve disc 84 to be broken, and results in reducing the pressure in the load cell communicating with port 40 by venting the load cell to atmosphere.

This pressure reduction occurs since the pressure in the load cell is greater than atmospheric, and when the seal between exhaust tube 62 and valve disc 84 is broken, there is a direct path from the load cell to atmosphere. The vent path is through exhaust port 40, into outlets 50 and 52, down passage 92, up exhaust tube 62, through pinion 68, into chamber 94, and out to atmosphere through exhaust port 36. The pressure reduction of the load cell communicating with port 40 causes alteration in the control system and results in feedback to the nozzle communicating with port 27, which increases the pressure through port 27 into chamber 90. As the pressure in chamber 90 increases, the pilot valve system returns to the balanced position of FIG. 1.

The use of post 70 of pinion 68 in supporting contact with ball bearing 80 of plunger 60 creates a pilot valve that is extremely sensitive in its response to pressure changes and in its adjustments for these changes. The earlier pilot valves were subject to frictional losses between exhaust tube 62 and the inner portion 42, which resulted in decreasing their sensitivity. With my new pilot valve, frictional losses are minimized by providing plunger 60 with ball bearing 80 firmly seated in tapered hole 82 with post 70 in supporting contact with ball 80 and having about 0.001 of an inch lateral freedom in hole 82. Also, guide hole 53 of inner portion 42 has a diameter that is 0.001 inches greater than the outer diameter of exhaust tube 62. This assures a close sliding fit between exhaust tube 62 and guide hole 53 and maintains exhaust tube 62 in the proper vertical orientation. This arrangement, alone with the guiding action of diaphragm 26, provides near perfect vertical movement of exhaust tube 62 with hole 53 serving as a lower guide and tapered hole 82 and diaphragm 26 serving as an upper guide. Furthermore, plunger 60 is able to freely pivot about ball bearing 80 on post 70 which allows exhaust tube 62 to move minutely sideways in guide hole 53 while experiencing insignificant frictional loss that could alter the movement of plunger 60 and draft tube 62 in sensing and adjusting for the pressure changes in the remainder of the control system. This allowable pivoting action enables plunger 60 to overcome the imperfections inherent in spring 64 without causing the pilot valve to bind. The pilot valve construction and operation, as described above, maintains complete concentricity with the central, vertical axis of the pilot valve, eliminates bind-up and assures a near perfect seal between the contacting surfaces of valve seat 48, exhaust tube 62 and valve disc 84, thus producing a non-bleed pilot valve.

Figure 4:
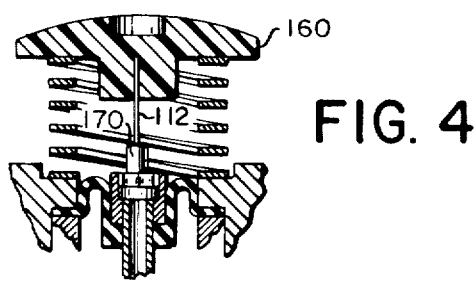
FIG. 4 is a cross sectional side view of another embodiment of this invention shown incorporated in a portion of the apparatus of FIG. 1.

In another embodiment of this invention, shown in FIG. 4, the function of ball bearing 80 and post 70 are performed by a flexible rod 112 that interconnects plunger 160 and post 170. The use of flexible rod 112 provides a similarly advantageous swivel joint, while allowing for the complete elemination of biasing spring 66.

Another improvement in my pilot valve which increases its sensitivity is the construction of the exhaust tube. By using collar 72 with pinion 68 pressed into one diameter and draft tube 62 pressed into another diameter, leaving gap 69 therebetween, an improved exhaust system is obtained. The sensitivity of the control system when adjusting for increasing pressure in the load cell communicating with port 40 is directly dependent upon the rate by which the load cell pressure can be controllably reduced. The use of exhaust tube 62 and pinion 68 press-fit into collar 72 forming gap 69 between them creates a novel exhaust system possessing a free unobstructed flow path into chamber 94, which is vented to atmosphere through exhaust port 36. This arrangement assures the free flow of any gaseous fluid to atmosphere while still maintaining the necessary control over this free flow to terminate it upon the proper signal.

Second portion 22 also comprises a tapered side 98 as shown in FIG. 1. This provides a second portion 22 with a larger diameter above tapered side 98 than below it. Also O-ring 46 has a smaller diameter than O-ring 44. This arrangement allows inner portion 42 to be inserted into second portion 22 without cutting O-ring 46. Since O-ring 46 has a smaller diameter than O-ring 44, O-ring 46 will easily slide through the larger diameter region above tapered side 98. The sharp corner 99 from port 40 normally would cut O-ring 46. However, the upper portion of tapered side 98 has a diameter greater than O-ring 46, and O-ring 46 passes corner 99 without being cut and is then gradually compressed into its final position shown in FIG. 1.

The use of my pilot valve with my weighbeam system is merely an example of one use of the valve. It is obvious to one skilled in the art that my pilot valve could be used in many control systems.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A pilot valve comprising:
   A. a diaphragm movable in response to pressure differentials;
   B. an elongated hollow valve operating member for following the motion of said diaphragm;
   C. means forming a swivel joint between said diaphragm and said member and comprising:
      a. an apical bearing surface mounted to said diaphragm,
      b. a spring biasing one end of said member against said surface, and
      c. a pinion pressed into the hollow, spring biased end of said member; whereby said member follows said diaphragm in its axial motion and said diaphragm is free to swivel without imparting angular motion to said member.

2. A pilot valve as defined in claim 1 wherein said bearing is a ball.

3. A pilot valve comprising:
   A. a diaphragm movable in response to pressure differentials;
   B. an elongated valve operating member for following the motion of said diaphragm;
   C. means forming a swivel joint between said diaphragm and said member whereby said member follows said diaphragm in its axial motion and said diaphragm is free to swivel without imparting angular motion to said member;
   D. a hollow exhaust tube connected for motion with said valve operating member; and
   E. a pinion pressed into the hollow end of said exhaust tube providing a substantially non-obstructed, controllable fluid exhaust path between the teeth of said pinion and the inner portion of said hollow exhaust tube.

4. A pilot valve as defined in claim 3, wherein said swivel joint comprises a flexible rod comprising a relatively uniform cross section throughout and interconnected with said exhaust tube and said diaphragm assuring simultaneous movement of said diaphragm and said exhaust tube in response to pressure variations.

* * * * *